(12) United States Patent
Ishikura et al.

(10) Patent No.: US 10,598,854 B2
(45) Date of Patent: Mar. 24, 2020

(54) MICRO OPTICAL CIRCUIT AND OPTICAL MODE CONVERTER

(71) Applicant: FUJIKURA LTD., Tokyo (JP)

(72) Inventors: Norihiro Ishikura, Sakura (JP); Shinichi Sakamoto, Sakura (JP)

(73) Assignee: FUJIKURA LTD., Tokyo (JP)

( * ) Notice: Subject to any disclaimer, the term of this patent is extended or adjusted under 35 U.S.C. 154(b) by 0 days.

(21) Appl. No.: 15/444,537

(22) Filed: Feb. 28, 2017

(65) Prior Publication Data

US 2017/0371101 A1 Dec. 28, 2017

(30) Foreign Application Priority Data

Jun. 24, 2016 (JP) ................. 2016-125575

(51) Int. Cl.
*G02B 6/14* (2006.01)
*G02B 6/125* (2006.01)
(Continued)

(52) U.S. Cl.
CPC ............... *G02B 6/14* (2013.01); *G02B 6/125* (2013.01); *G02B 6/1228* (2013.01); *G02B 6/2793* (2013.01)

(58) Field of Classification Search
CPC ................... G02B 6/14; G02B 6/125
(Continued)

(56) References Cited

U.S. PATENT DOCUMENTS 9,081,138 B2 * 7/2015 Ho ..................... G02B 6/12004
9,690,043 B2 * 6/2017 Matsumoto .......... G02B 6/1228
(Continued)

FOREIGN PATENT DOCUMENTS

JP 2004-133446 A 4/2004
JP 2011-22464 A 2/2011
(Continued)

OTHER PUBLICATIONS

Shoji et al., "Low loss mode size converter from 0.3 μm square Si wire waveguides to singlemode fibres", Electronics Letters, (Dec. 2002), vol. 38, No. 25, pp. 1669-1670. Cited in Specification. (2 pages).

(Continued)

*Primary Examiner* — Kaveh C Kianni
(74) *Attorney, Agent, or Firm* — Westerman, Hattori, Daniels & Adrian, LLP (57) ABSTRACT

Provided is a micro optical circuit including a first micro optical waveguide and a second micro optical waveguide with a boundary face therebetween, in which the height of the first and second micro optical waveguides is different from each other, and the side faces of the first micro optical waveguide are connected to the side faces of the second micro optical waveguide at first and second connection points in a plan view. An intersection between the boundary face and the center line equidistant from the two side faces of the second micro optical waveguide is present in a region between a first straight line and a second straight line in a plan view, the first straight line passing through the first and second connection points, the second straight line crossing the second micro optical waveguide so as not to cross the first micro optical waveguide.

10 Claims, 8 Drawing Sheets

(51) Int. Cl.
*G02B 6/27* (2006.01)
*G02B 6/122* (2006.01)

(58) Field of Classification Search
USPC .......................................................... 385/28
See application file for complete search history.

(56) References Cited

U.S. PATENT DOCUMENTS

| | | | | |
|---|---|---|---|---|
| 2003/0103722 | A1* | 6/2003 | Naruse | G02B 6/12011 385/24 |
| 2004/0057667 | A1* | 3/2004 | Yamada | G02B 6/1228 385/43 |
| 2009/0245728 | A1* | 10/2009 | Cherchi | G02B 6/14 385/28 |
| 2010/0086255 | A1* | 4/2010 | Ishizaka | G02B 6/1228 385/31 |
| 2010/0150500 | A1 | 6/2010 | Pyo et al. | |
| 2010/0266288 | A1* | 10/2010 | Little | G02B 6/1228 398/139 |
| 2011/0194572 | A1* | 8/2011 | Yamazaki | G02B 6/125 372/6 |
| 2011/0205660 | A1* | 8/2011 | Komura | B82Y 20/00 360/59 |
| 2011/0292774 | A1* | 12/2011 | Osawa | G02B 6/122 369/13.33 |
| 2012/0093456 | A1* | 4/2012 | Taillaert | G02B 6/1228 385/14 |
| 2014/0254998 | A1* | 9/2014 | Furuya | G02F 1/2257 385/131 |
| 2015/0268419 | A1 | 9/2015 | Van Steenberge et al. | |
| 2016/0062038 | A1* | 3/2016 | Oka | G02B 6/1228 385/1 |
| 2016/0085026 | A1* | 3/2016 | Yamasaki | G02B 6/1228 385/43 |
| 2016/0124148 | A1* | 5/2016 | Matsumoto | G02B 6/126 385/28 |

FOREIGN PATENT DOCUMENTS

| | | |
|---|---|---|
| JP | 2015-191029 A | 11/2015 |
| JP | 2016-90711 A | 5/2016 |

OTHER PUBLICATIONS

Fang et al., "Suspended optical fiber-to-waveguide mode size converter for silicon photonics", Optics Express, (2010), vol. 18, No. 8, pp. 7763-7769, Cited in Specification. (7 pages).

Office Action dated Jan. 23, 2018, issued in counterpart Japanese Application No. 2016-125575. (4 pages).

Notice of Allowance dated Jul. 17, 2018, issued in counterpart Japanese Application No. 2016-125575, with English machine translation. (6 pages).

* cited by examiner

MICRO OPTICAL CIRCUIT AND OPTICAL MODE CONVERTER

BACKGROUND OF THE INVENTION

Field of the Invention

The present invention relates to a micro optical circuit and an optical mode converter.

Priority is claimed on Japanese Patent Application No. 201.6425575, filed Jun. 24, 2016, the contents of which are incorporated herein by reference.

Description of Related Art

A micro optical circuit including a sub-micron scale micro optical waveguide is used for high density integration of an optical circuit.

In general, since a refractive index difference between the core and the cladding in the micro optical waveguide is large, light propagating through the micro optical waveguide is strongly confined in a micro region. The mode diameter which corresponds to an index of confinement, is much less than 1 µm in the micro optical waveguide. Such a micro optical waveguide having a small mode diameter is very advantageous in high density integration of an optical circuit.

On the other hand, in connecting the micro optical waveguide and the optical fiber to each other, it is necessary to compensate for the difference of the mode diameters of both. The mode diameter of the micro optical waveguide is ⅒ or less of the mode diameter (10 µm) of the normal optical fiber.

As a method of compensating for the mode diameter difference described above, "T. Shoji, T. Tsuchizawa, Watanabe, K. Yamada, and H. Morita, "Low loss mode size converter from 0.3 µm square Si wire waveguides to singlemode fibres," Electronics Letters, vol. 38, no. 25, pp. 1669-1670, December 2002" discloses a structure which, in an optical waveguide whose fundamental mode cutoff wavelength is shorter than the operation wavelength, increases the mode diameter of the optical waveguide by allowing the optical mode to leak from the core to the cladding.

For the purpose of increasing the mode diameter, the size of the optical waveguide is preferably as small as possible. In particular, as the height of the optical waveguide becomes smaller, a more efficient optical connection can be obtained for the TM mode in which the electric field amplitude component in the height direction of the optical waveguide is stronger. However, if the height of the optical waveguide is determined in consideration of only the conversion of the mode diameter, matching with other optical devices may be difficult.

Therefore, the structure of an optical waveguide whose height gradually changes has been studied.

Japanese Unexamined Patent Application, First Publication No. 2015-191029 (Patent Document 1) discloses a spot size converter having an input end and an output end with different sizes. In the spot size converter, two optical waveguides having different heights and continuously changing width are used. It is described that, according to the structure, it is possible to reduce the mode conversion loss for both TE polarization and TM polarization.

Japanese Unexamined Patent Application, First Publication No. 2004-133446 (Patent Document 2) discloses an optical module having a first core formed of silicon, a second core that is formed of polymer and is disposed so as to cover the first core, and an overcladding that covers the cores. It is described that, according to the structure, it is possible to reduce the connection loss with respect to the optical fiber by adjusting the refractive index of the overcladding.

A mode diameter converter having two optical waveguides with different heights is disclosed in QING FANG; TSUNG-YANG LIOW; JUN FENG SONG; CHEE WEI TAN; MING BIN YU; GUO QIANG LO; DIM-LEE KWONG: "Suspended optical fiber-to-waveguide mode size converter for silicon photonics", OPTICS EXPRESS, vol. 18, no. 8, pages 763-7769, (2010) (Non-Patent Document 1). It is described that, according to the configuration, it is possible to realize match with other optical devices (an $SiO_2$ waveguide at one end and an Si waveguide at the other end).

In the spot size converter disclosed in Patent Document 1, it is necessary to set the height of the optical waveguide to a specific value in order to reduce the polarization dependency of the mode conversion loss. This may have an adverse effect on the degree of freedom in designing optical devices connected to the optical waveguide.

In the optical module disclosed in Patent Document 2, it is necessary to expose a fine silicon wire formed of silicon. Therefore, a problem in terms of mechanical strength may occur. Alternatively, it is necessary to overlay a core formed of silicon and a core formed of polymer. In such a structure combining different kinds of materials, the complicatedness of the manufacturing process may become a problem.

In the optical module disclosed in Non-Patent Document 1, the height of the optical waveguide changes discontinuously at a boundary face perpendicular to the propagation direction light. For this reason, a large loss difference between TE polarization and TM polarization at the boundary face of the optical waveguide may be a problem.

It is an object of the invention to provide a micro optical circuit which includes two micro optical waveguides with different heights and has high optical connection efficiency between the two micro optical waveguides, and an optical mode converter including the micro optical circuit.

SUMMARY

A micro optical circuit according to an aspect of the present invention includes: a first micro optical waveguide having a first bottom face, a first top face arranged at a first height from the first bottom face, and a first side face and a second side face substantially perpendicular to the first bottom face and the first top face; and a second micro optical waveguide having a second bottom face, a second top face arranged at a second height from the second bottom face, a third side face and a fourth side face substantially perpendicular to the second bottom face and the second top face, and a boundary face to which the first micro optical waveguide is connected, the second height being larger than the first height. The first side face is connected to the third side face at a first connection point in a plan view. The second side face is connected to the fourth side face at a second connection point in a plan view. An intersection between the boundary face and a center line equidistant from the third side face and the fourth side face is present in a region between a first straight line and a second straight line in a plan view, the first straight line passing through the first connection point and the second connection point, the second straight line crossing the second micro optical waveguide so as not to cross the first micro optical waveguide.

In the above-described micro optical circuit, it may be arranged such that the entire boundary face is present in a region between the first straight line and the second straight line in a plan view.

In the above-described micro optical circuit, it may be arranged such that the entire boundary face is present in a region between the first straight line and a third straight line in a plan view, the third straight line passing through an intersection between the center line and the boundary face.

In the above-described micro optical circuit, it may be arranged such that the boundary face has a section it which a distance between the boundary face and the center line monotonously decreases toward a point B on the boundary face, the point B being closest to the second straight line s2, the section includes the point B, and, in the section, a decrease rate of the distance increases as a distance from the point B decreases.

In the above-described micro optical circuit, it may be arranged such that the boundary face is symmetrical with respect to the center line in a plan view.

In the above-described micro optical circuit, it may be arranged such that a distance between the third side face and the fourth side face is substantially constant.

In the above-described micro optical circuit, it may be arranged such that a distance between the third side face and the fourth side face increases or decreases as a distance from the first micro optical waveguide increases.

An optical mode converter according to another aspect of the present invention includes: the above-described micro optical circuit; and a cladding covering the micro optical circuit.

According to some aspects of the present invention, it is possible to provide a micro optical circuit, which includes two micro optical waveguides with different heights and has high optical connection efficiency between the two micro optical waveguides, and an optical mode converter including the micro optical circuit.

DESCRIPTION OF THE PREFERRED EMBODIMENTS

Hereinafter, a micro optical circuit and an optical mode converter according to an embodiment of the invention will be described with reference to the accompanying drawings.

Figure 1:
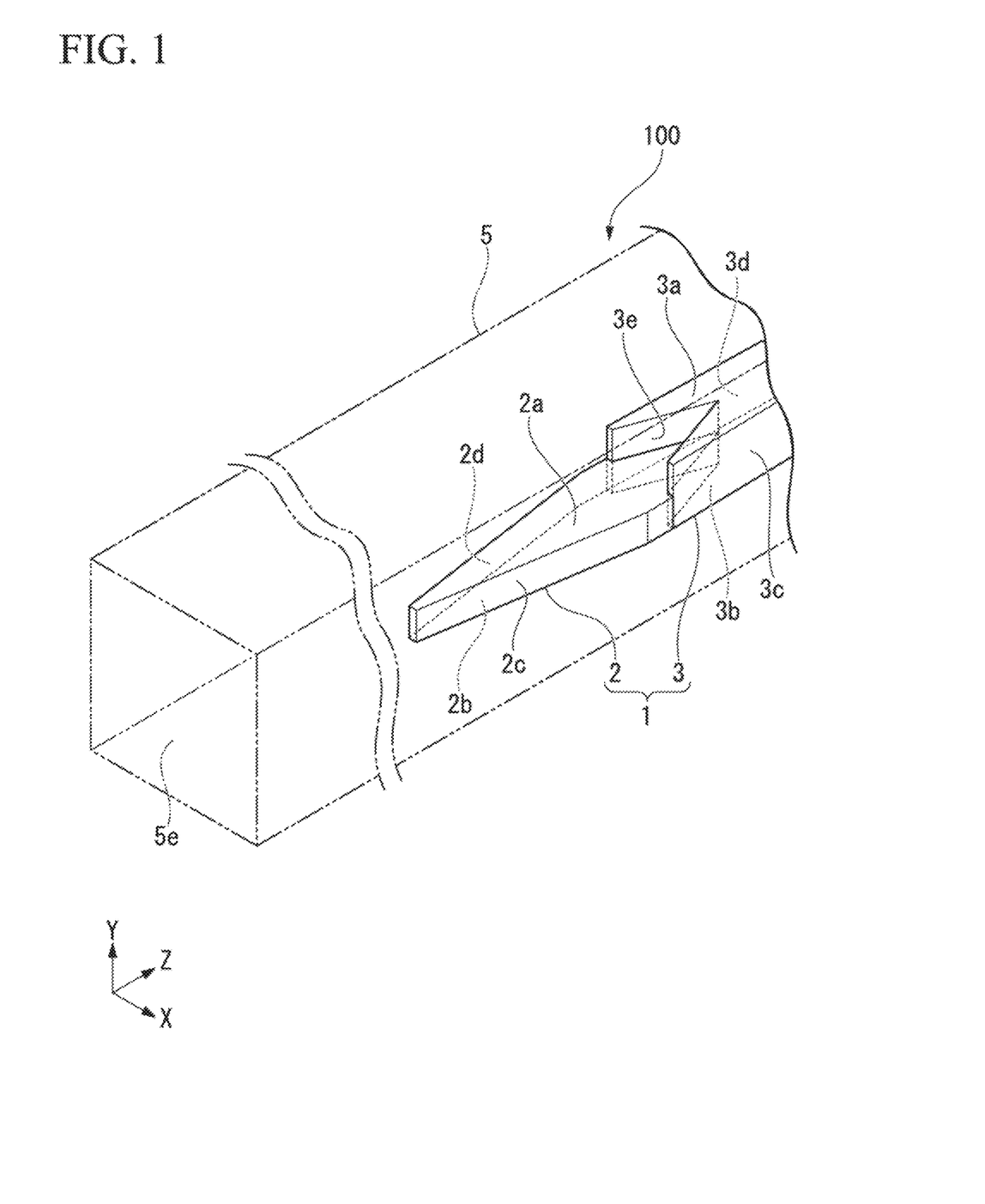
FIG. 1 is a perspective view schematically showing a micro optical circuit and an optical mode converter according to an embodiment.
Figure 2:
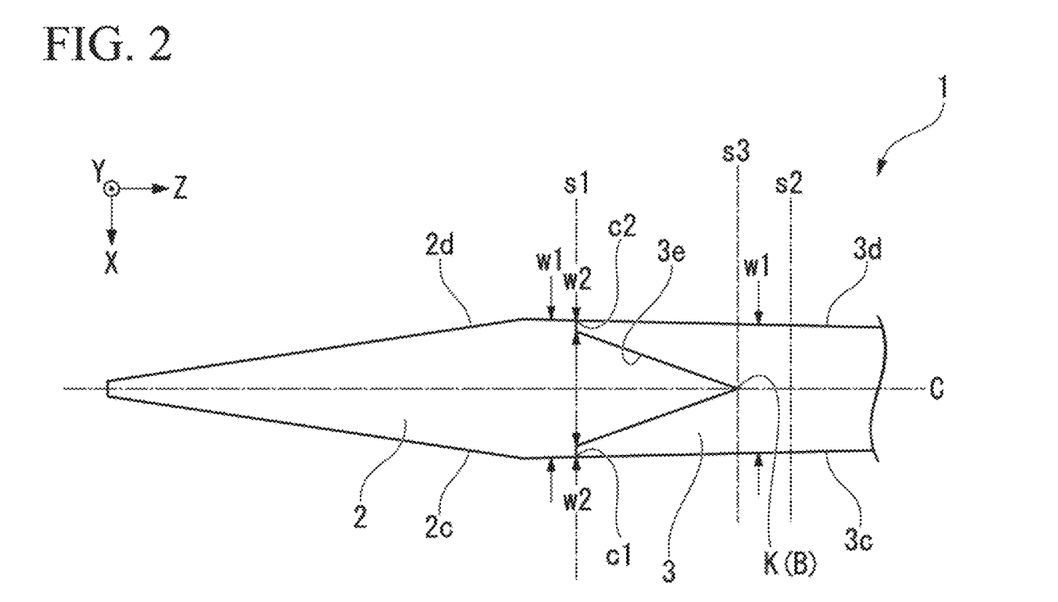
FIG. 2 is a plan view schematically showing the micro optical circuit shown in FIG. 1.
Figure 3:
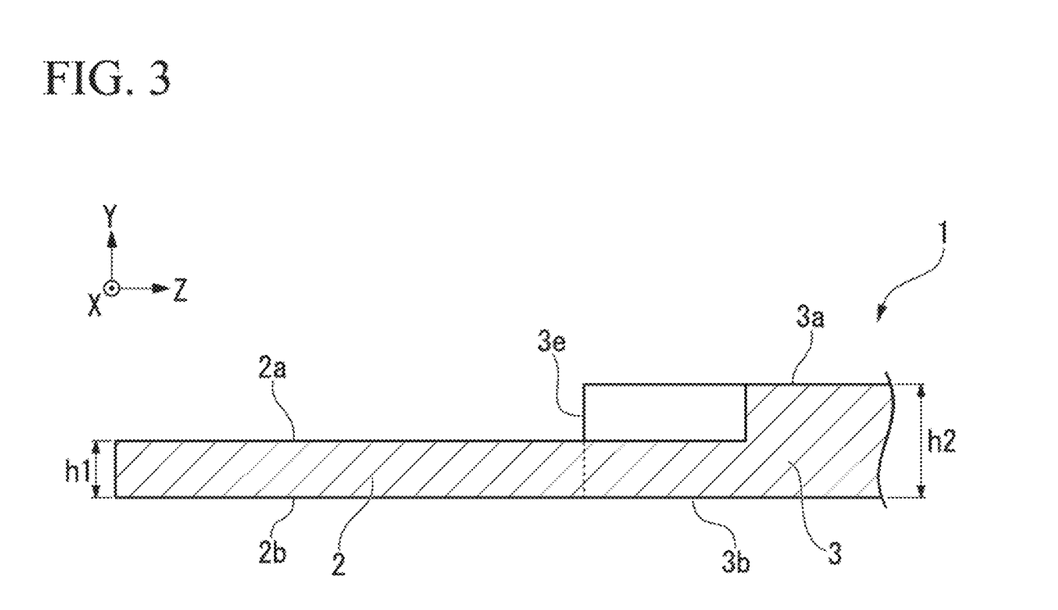
FIG. 3 is a cross-sectional view schematically showing a longitudinal section along the center line of the micro optical circuit shown in FIG. 1.

FIG. 1 is a perspective view schematically showing a micro optical circuit and an optical mode converter according to embodiment. FIG. 2 is a plan view showing the upper surface of the micro optical circuit shown in FIG. 1. FIG. 3 is a cross-sectional view showing a longitudinal section along the center line of the micro optical circuit shown in FIG. 1.

Referring to FIG. 1 to FIG. 3, a micro optical circuit 1 includes a first micro optical waveguide 2 and a second micro optical waveguide 3. The first micro optical waveguide 2 has a first bottom face 2b, a first top face 2a arranged at a first height h1 from the first bottom face 2b, and a first side face 2c and a second side face 2d, the side faces being substantially perpendicular to the first bottom face 2b and the first top the 2a.

The second micro optical waveguide 3 has a second bottom face 3b a second top face 3a arranged at a second height h2 (which is larger than the first height h1) from the second bottom face 3b, a third side face 3c and a fourth side face 3d, the side faces substantially perpendicular to the second bottom face 3b and the second top face 3a, and a boundary face 3e to which the first micro optical waveguide 2 is connected.

The first side face 2c is connected to the third side face 3c at a first connection point c1 in a plan view. The second side face 2d is connected to the fourth side face 3d at a second connection point c2 in a plan view.

In the micro optical circuit 1 shown in FIG. 1 to FIG. 3, the first top face 2a, the second top face 3a, the first bottom face 2b, and the second bottom face 3b are substantially parallel to each other, and the boundary face 3e is substantially perpendicular to the first top face 2a (second top face 3a) and the first bottom face 2b (3b). However, the relationship of these faces can be preferably changed as long as the effects to be described later can be obtained.

The first and second micro optical waveguides 2 and 3 are formed of the same type of material and examples thereof include a semiconductor material such as silicon. Specifically, the first micro optical waveguide 2 and the second micro optical waveguide 3 may be integrally formed on the silica in the same process by processing the uppermost silicon (Si) layer of a Silicon On Insulator (SOI) substrate formed of silicon (Si)-silica ($SiO_2$)-silicon (Si). Known methods, such as etching, may be used for processing of silicon.

An optical waveguide including the first micro optical waveguide 2 and a cladding 5 around the first micro optical waveguide 2 is a micro optical waveguide whose fundamental mode cutoff wavelength is shorter than the operation wavelength. In other words, the optical waveguide including the first micro optical waveguide 2 and a cladding 5 around the first micro optical waveguide 2 has a mode diameter greater than the size of the first micro optical waveguide 2. For example, in a case where the first micro optical waveguide 2 is formed of silicon and the cladding 5 is formed of silica to guide a light with a wavelength of 1.55 μm, the width (size in the X direction in the figures) of the first micro optical waveguide 2 may be, for example, 0.2 μm or less.

In a plan view of the micro optical circuit 1, an intersection K between a center line (center axis) C equidistant from the third and fourth side faces 3c and 3d and the boundary face 3e is present in a region (excluding a region on a first straight line s1) between the first straight line s1 and a second straight line s2, the first straight line s1 passing through the first connection point c1 and the second connection point c2, the second straight line s2 crossing the second micro optical waveguide 3 so as not to cross the first micro optical waveguide 2. As shown in the example of FIG. 2, the entire boundary face 3e may be present in a region between the first and second straight lines s1 and s2 in a plan view. The entire boundary face 3e may be present in a region between the first straight line s1 and a third straight line s3 passing through the intersection K in a plan view.

In the example shown in FIG. 2, the first micro optical waveguide 2 and the second micro optical waveguide 3 have a width of w1 in the vicinity of the boundary face 3e. The boundary face 3e extends alone the first straight line s1 by a distance of w2 from the connection points c1 and c2. The distance (width) w2 may be substantially 0.

A center portion of the boundary face 3e in the horizontal direction is recessed in the depth direction (i.e., +Z direction in the figures). As shown in FIG. 2, an innermost point B of the boundary face 3e may be on a center line C.

Some modified examples of the above micro optical circuit 1 will be described with reference to FIG. 4 to FIG. 6. Descriptions of components having the same structure as those of the micro optical circuit 1 described above will be omitted.

Figure 4:
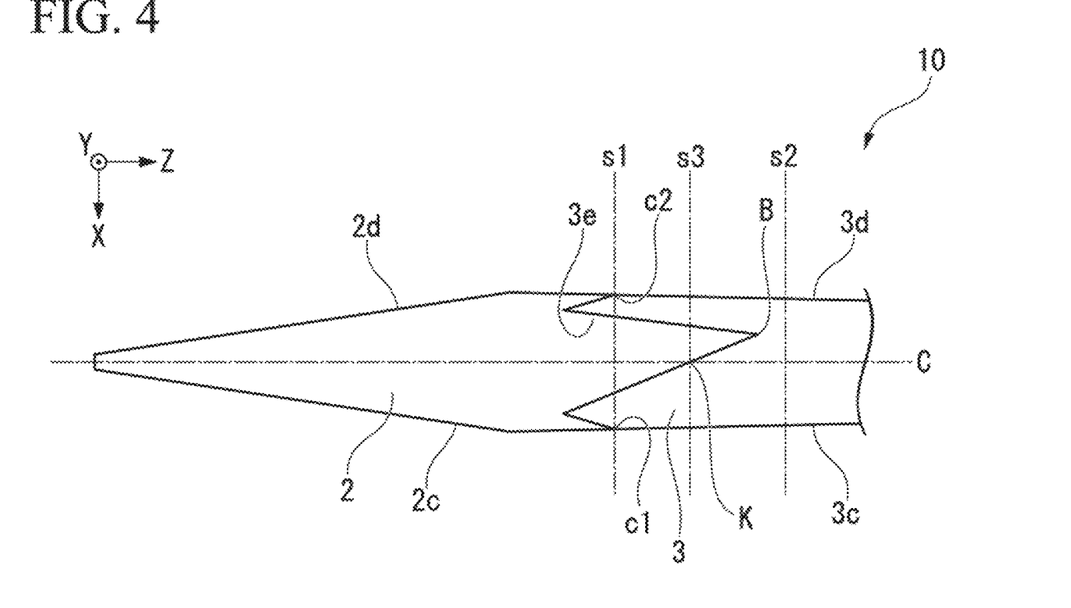
FIG. 4 is a plan view schematically showing a micro optical circuit according to a first modified example.

FIG. 4 is a plan view schematically showing a micro optical circuit 10 according to a first modified example. The micro optical circuit 10 has the same structure as the micro optical circuit 1 except for the shape of the boundary face 3e.

The boundary face 3e of the micro optical circuit 10 extends from the connection points c1 and c2 toward the first micro optical waveguide 2 (i.e., −Z direction in the figure). In other words, the boundary face 3e is not present in a region between the first straight line s1 and the third straight line s3 in the vicinity of the third side face 3c and the fourth side face 3d.

The point B at the innermost position of the boundary face 3e deviates from the center line C and is present in a region between the second straight line s2 and the third straight line s3.

Figure 5:
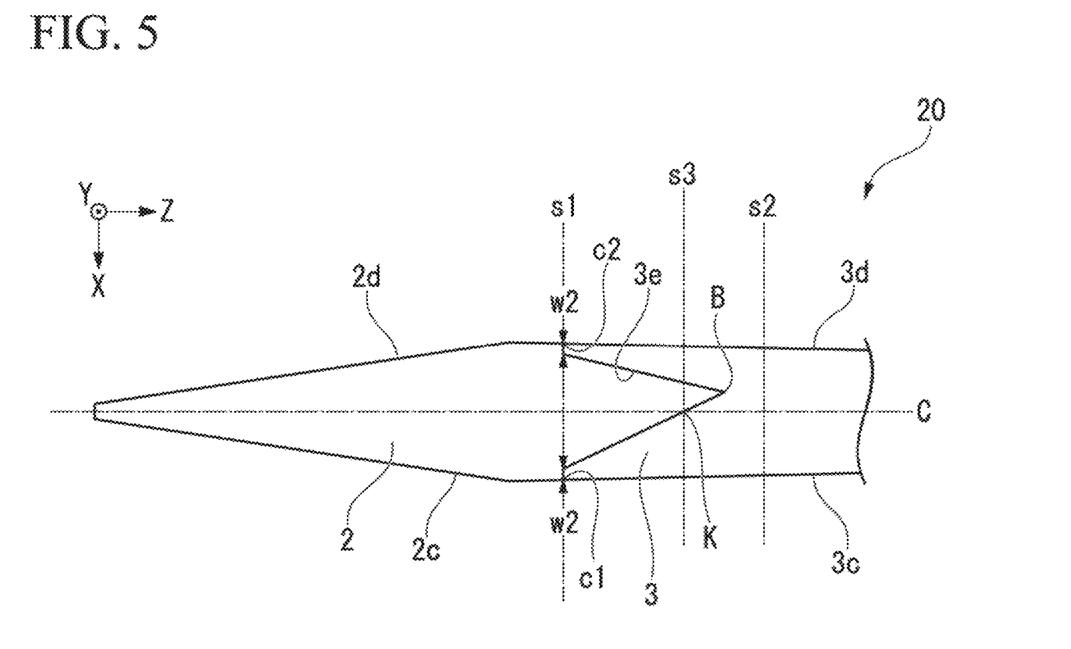
FIG. 5 is a plan view schematically showing a micro optical circuit according to a second modified example.

FIG. 5 is a plan view schematically showing a micro optical circuit 20 according to a second modified example. The micro optical circuit 20 has the same structure as the micro optical circuit 1 except for the shape of the boundary face 3e.

The boundary face 3e of the micro optical circuit 20 extends along the first straight line s1 by a distance of w2 from the connection points c1 and c2. The distance (width) w2 may be substantially 0. The point B at the innermost position of the boundary face 3e deviates from the center line C, and is present in a region between the second straight line s2 and the third straight line s3.

Figure 6:
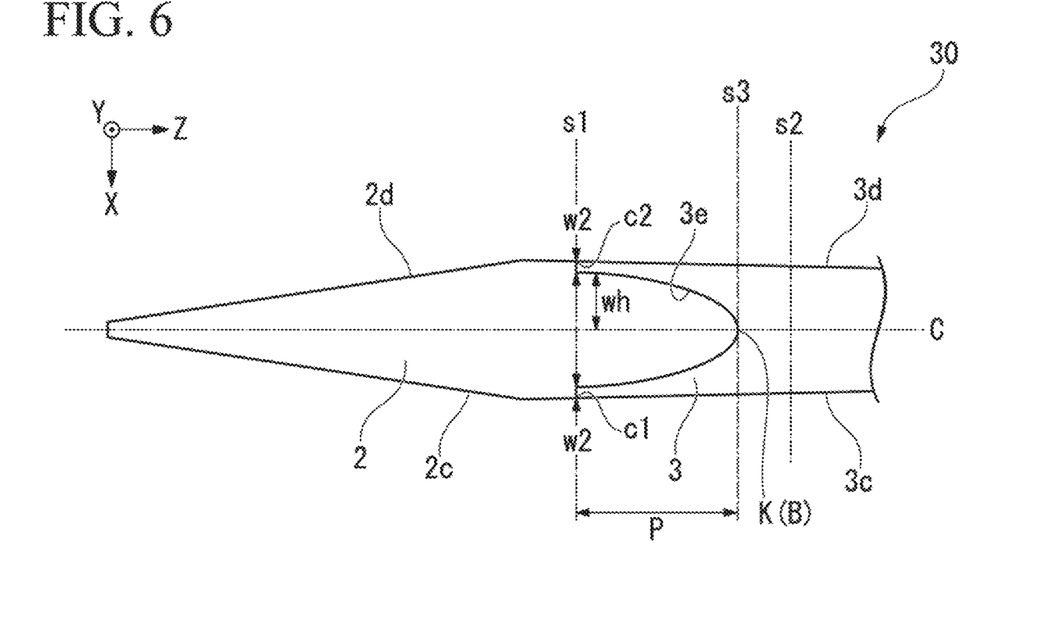
FIG. 6 is a plan view schematically showing a micro optical circuit according to a third modified example.

FIG. 6 is a plan view schematically showing a micro optical circuit 30 according to a third modified example. The micro optical circuit 30 has the same structure as the micro optical circuit 1 except for the shape of the boundary face 3e.

The boundary face 3e of the micro optical circuit 20 extends along the first straight line s1 by a distance of w2 from the connection points c1 and c2. The distance (width) w2 may be substantially 0.

A center portion of the boundary face 3e in the horizontal direction is recessed in the depth direction (i.e., +Z direction in the diagram). More specifically, the boundary face 3e has a section P in which a distance wh between the boundary face 3e and the center line C monotonously decreases toward a point B on the boundary face 3e, the point B being closest to the second straight line s2. The section P includes the point B. In the section P, the decrease rate of the distance wh increases as the distance from the point B decreases. In other words, in the vicinity of the boundary face 3e where the first and second micro optical waveguides 2 and 3 are present, the area of the second micro optical waveguide 3 in the unit length in the depth direction monotonously decreases in the vicinity of the center of the boundary face 3e, and the decrease rate increases as the distance from the center of the boundary face 3c decreases.

In the example shown in FIG. 6, the point B an the center line C and the boundary face 3e is symmetrical with respect to the center line C. However, as long as the boundary face 3e has the above-described section P, the position of the point B and the symmetry of the boundary face 3e may be preferably adjusted. The section P may be arranged in part of the boundary face 3e including the point B.

Examples of the shape of the boundary face 3e in the section P include a shape represented by the high-order polynomial of second order or higher.

The mode (electric field intensity) of light propagating through the above-described micro optical circuit (micro optical waveguide) is strongest at the center of the cross section perpendicular to the central axis (center line C) and weakens as the distance from the center increases. In the micro optical circuits 1, 10, 20, and 30, the boundary face 3e in the vicinity of the center line C is arranged deeper than the boundary face 3e in the vicinity of the third and fourth side faces 3c and 3d in the depth direction (Z direction in the figures), which will allow the stronger light propagating through the vicinity of the center of the micro optical waveguide to be subject to less change at the boundary face 3e.

According to the micro optical circuits 1, 10, 20, and 30 described above, since the intersection K between the center line C and the boundary face 3e is present in a region (excluding a region on the first straight line s1) between the first and second straight lines s1 and s2 in a plan view, it is possible to mitigate a change in the mode shape of light propagating through the first micro optical waveguide 2 and the second micro optical waveguide 3 at the boundary face 3e. Therefore, it is possible to realize mode diameter conversion with higher efficiency (less loss) between the two micro optical waveguides 2 and 3 having different heights.

In particular, for the TM mode in which the electric field oscillates in the height direction of the micro optical waveguides 2 and 3 (i.e., the Y direction in the figures), it is possible to further mitigate a change of the mode diameter due to the height difference between the micro optical waveguide 2 and the micro optical waveguide 3.

In the micro optical circuits 1, 20, and 30 described above, since the entire boundary face 3e is arranged at the same position as or deeper than the connection points c1 and c2 in the depth direction (Z direction in the figures), it is possible to further mitigate the change which the light propagating through the micro optical waveguide will receive at the boundary face 3e.

That is, according to the micro optical circuits 1, 20, and 30 described above, since the entire boundary face 3e is present in a region between the first and second straight lines s1 and s2 in a plan view, it is possible to make more gentle the change in the mode shape of light propagating through the micro optical waveguides 2 and 3 at the boundary face 3e. Therefore, it is possible to realize the more efficient mode diameter conversion between the two micro optical waveguides 2 and 3 having different heights.

In the micro optical circuits 1 and 30 described above, since the point B at the innermost position of the boundary face 3e is on the center line C, it is possible to more effectively reduce the change which the strongest light portion of the light propagating through the center of the micro optical waveguide will receive at the boundary face 3e.

In other words, according to the micro optical circuits 1 and 30 described above, since the entire boundary face 3e is present in a region between the first straight line s1 and the third straight line s3 in a plan view, it is possible to further reduce the change in the mode diameter of light propagating through the micro optical waveguide 2 and the micro optical waveguide 3 at the boundary face 3e. Therefore, it is possible to realize the mode diameter conversion with higher efficiency between the two micro optical waveguides 2 and 3 having different heights.

In the micro optical circuit 30 described above, in the vicinity of the boundary face 3e, the area of the second micro optical waveguide 3 in the unit length in the depth direction monotonously decreases in the vicinity of the center of the boundary face 3e. The rate of the decrease increases as the distance from the vicinity of the center of the boundary face 3e decreases. For this reason, it is possible to further reduce the change which the strongest light portion of the light propagating through the center of the micro optical waveguide will receive at the boundary face 3e. Therefore, it is possible to realize the more efficient mode diameter conversion between the two micro optical waveguides 2 and 3 having different heights.

In particular, as exemplarily shown in FIG. 6, in a case where the point B is on the center line C, the above-described effect is most remarkably obtained.

In the micro optical circuits 1, 10, 20, and 30 described above, the third side face 3c and the fourth side face 3d may be substantially parallel to each other. In this case, it is possible to realize propagation of light with less loss in the second micro optical waveguide 3.

In the micro optical circuits 1, 10, 20, and 30 described above, the distance between the third side face and the fourth side face may increase or decrease as the distance from the first micro optical waveguide increases. In this case, the width of the second micro optical waveguide 3 may be adjusted in accordance with the mode diameter of an optical device connected to the end of the second micro optical waveguide 3.

In the micro optical circuits 1 and 30 described above, the boundary face 3e may be symmetrical with respect to the center line C in a plan view. In this case, the efficient mode diameter conversion described above can be realized more uniformly in the micro optical circuit.

In the micro optical circuits 1, 10, 20, and 30 described above, the first straight line s1 may be perpendicular to the center line C, or may not be perpendicular to the center line C. In the other words, the second connection point c2 may be or may not be on a straight line passing through the first connection point c1 and perpendicular to the center line C. The boundary face 3e may have one or more bending points between the first straight line s1 and the point B.

The boundary face 3e may have a linear section substantially perpendicular to the center line C instead of the point B. For example, in FIG. 2, the boundary face 3e may have a linear section, which is substantially perpendicular to the center line C and is on the third straight line s3, instead of the point B.

As exemplarily shown in FIG. 1, an optical mode converter 100 includes the micro optical circuit 1 described above and a cladding 5 that covers the micro optical circuit 1. The optical mode converter 100 may include the micro optical circuit 10, 20, or 30 described above.

Example of a material for the cladding 5 include a material having a lower refractive index than the material of the first micro optical waveguide 2 and the second micro optical waveguide 3. For example, in a case where the first micro optical waveguide 2 and the second micro optical waveguide 3 are thrilled of silicon (Si), the cladding 5 may be formed of silica ($SiO_2$).

An optical device, such as an optical fiber, can be connected to an end surface 5e of the cladding 5. Any preferable structure may be added to the cladding 5 in accordance with the structure of an optical device connected to the end surface 5e.

According to the optical mode converter 100 described above, since it includes the micro optical circuit (1, 10, 20, and 30) capable of achieving mode diameter conversion with high efficiency, it is possible to provide an optical mode converter capable of achieving highly efficient optical mode conversion.

Examples

Evaluation of the conversion efficiency of the micro optical circuit 1 described above was performed using simulations. For comparison purposes, the same evaluation was performed for a micro optical circuit according to a conventional example.

Figure 10:
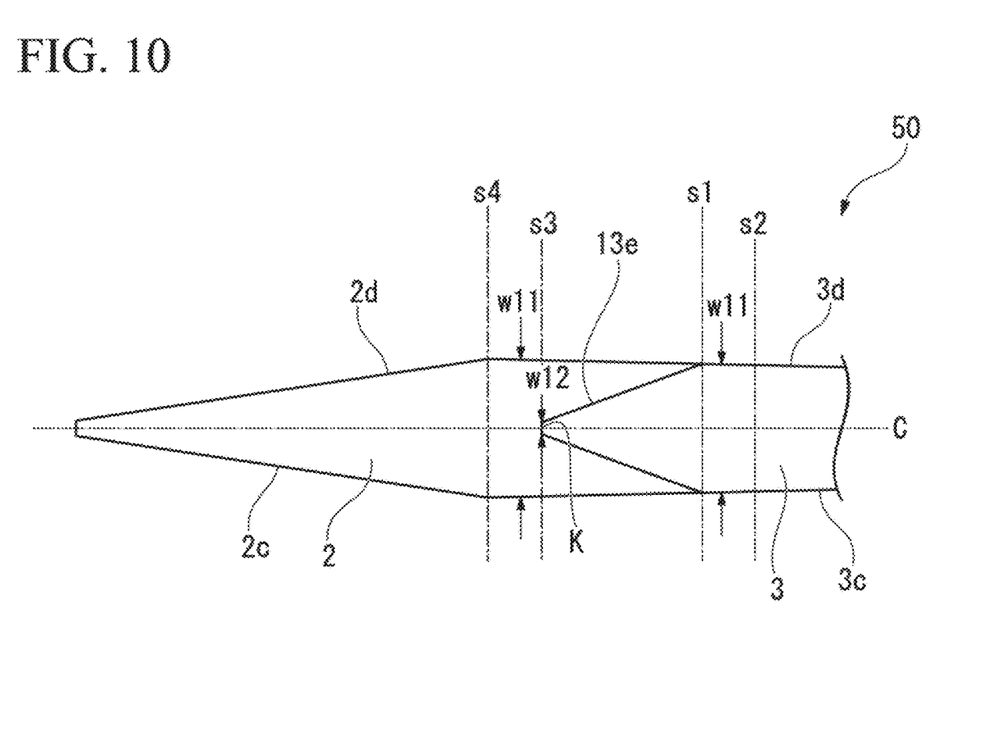
FIG. 10 is a plan view schematically showing the micro optical circuit according to the conventional example.
Figure 11:
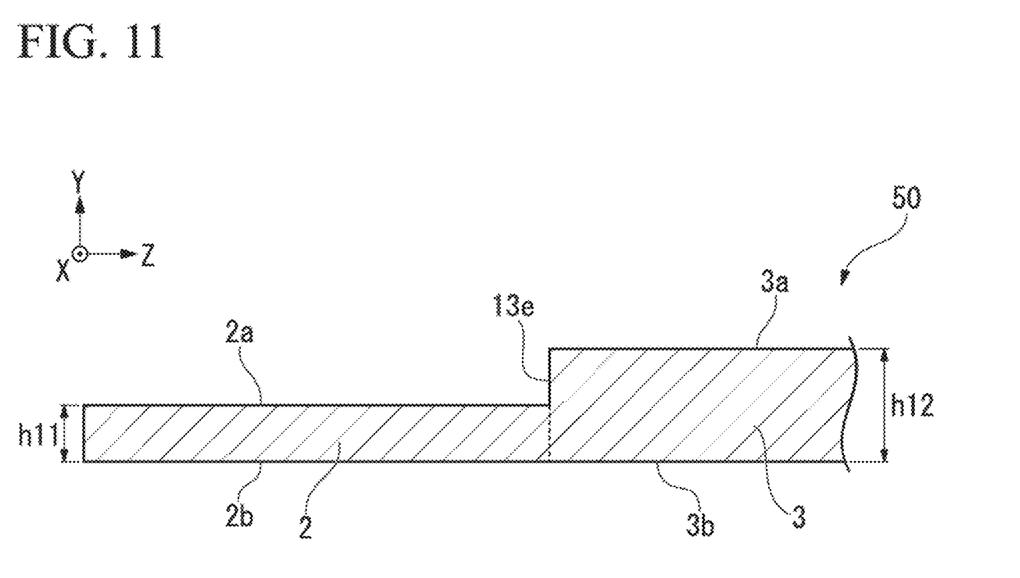
FIG. 11 is a cross-sectional view schematically showing a longitudinal section along the center line of the micro optical circuit according to the conventional example.

Referring to FIG. 10 and FIG. 11, a micro optical circuit 50 according to a conventional example has the same structure as the micro optical circuit 1 described above except for the boundary face of the second micro optical waveguide 3 to which the first micro optical waveguide 2 is connected.

The center of a boundary face 13e of the micro optical circuit 50 protrudes toward the first micro optical waveguide 2. More specifically, the intersection K between the center C and the boundary face 13e is present in a region between the first straight line s1 and a fourth straight line s4, the fourth straight line s4 crossing the first micro optical waveguide 2 so as not to cross the second micro optical waveguide 3.

The first micro optical waveguide 2 and the second micro optical waveguide 3 of the micro optical circuit 50 have a width of w11 in the vicinity of the boundary face. 13e. The boundary face 13e is symmetrical with respect to the centerline C, and has a section with a width of w12 in the vicinity of the center line C.

For the micro optical circuit 50 and the aforementioned micro optical circuit 1, changes in light transmittance and optical mode (electric field intensity) at the boundary face were evaluated. Both the micro optical circuits 1 and 50 are formed of silicon, and are covered with the cladding 5 formed of silica. In this evaluation, w2=w12=0.14 µm, h2=h12=0.22 µm, and the wavelength of light propagating through the micro optical circuits 1 and 50 is 1.55 µm.

Using the finite element method, the degree of matching (overlap integral value) between the optical mode distribution (electric field intensity distribution) of the first micro optical waveguide 2 and the optical mode distribution of the second micro optical waveguide 3 in the vicinity of the boundary face 3e was calculated.

Based on the degree of matching, a transmittance at the boundary face 3e of the micro optical circuit 1 was calculated for each of the TE mode light and the TM mode light. Similarly, a transmittance at the boundary face 13e of the micro optical circuit 50 was calculated.

Figure 7A:
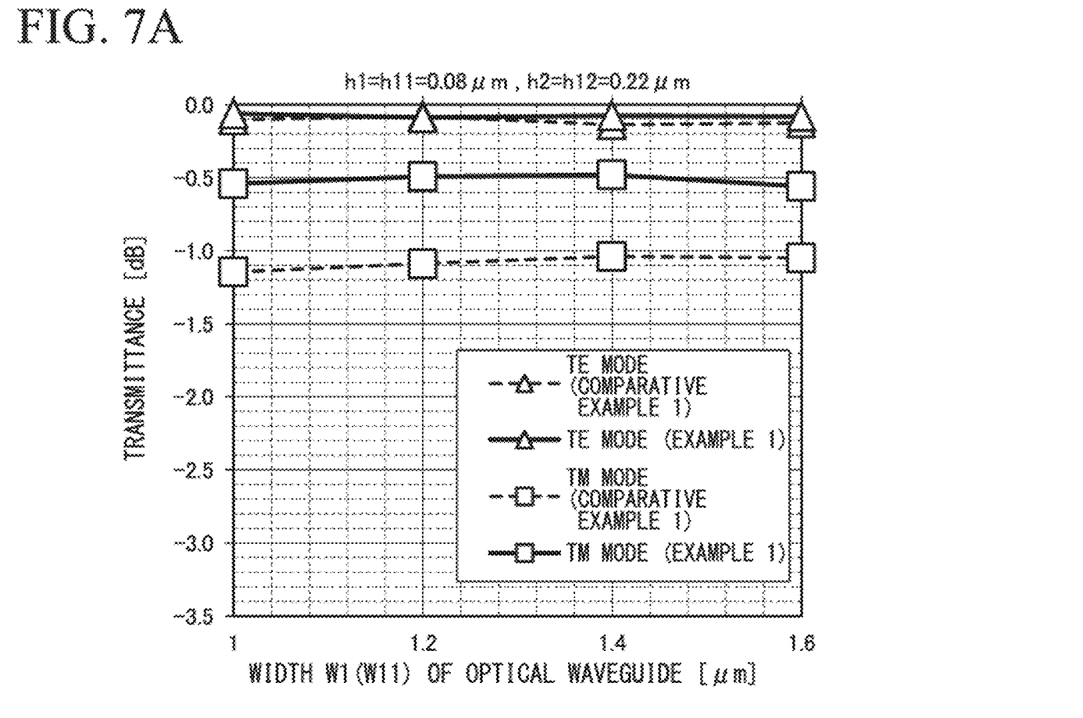
FIG. 7A is a graph showing the transmittance of the micro optical circuit according to the embodiment and a micro optical circuit according to a conventional example for TE mode light and TM mode light.
Figure 7B:
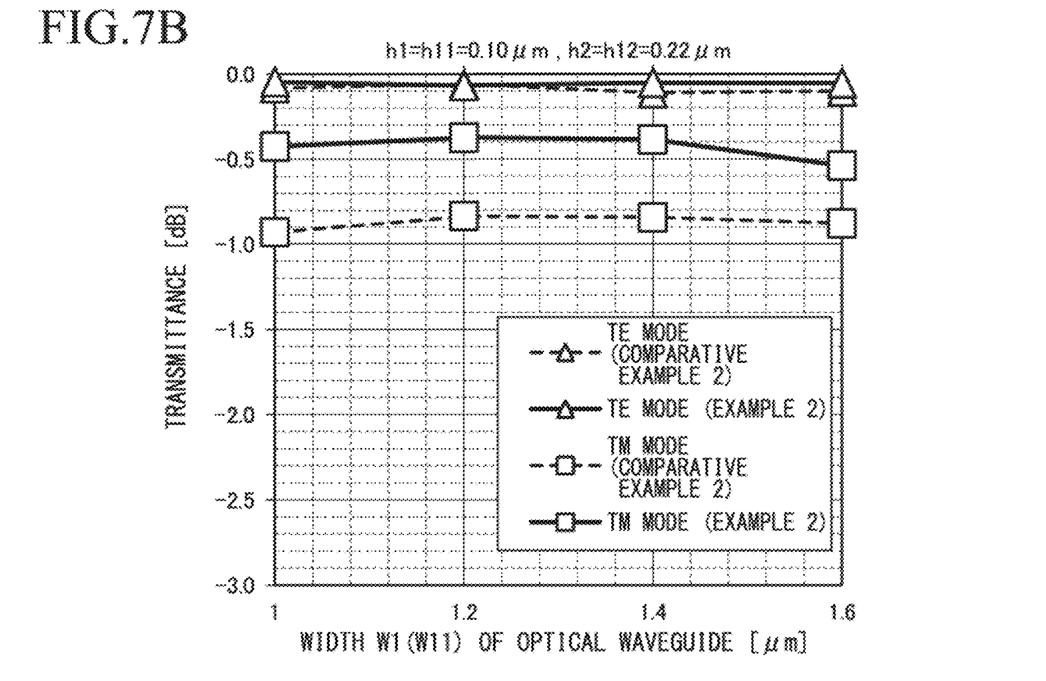
FIG. 7B is a graph showing the transmittance of the micro optical circuit according to the embodiment and the micro optical circuit according to the conventional example for TE mode light and TM mode light.
Figure 7C:
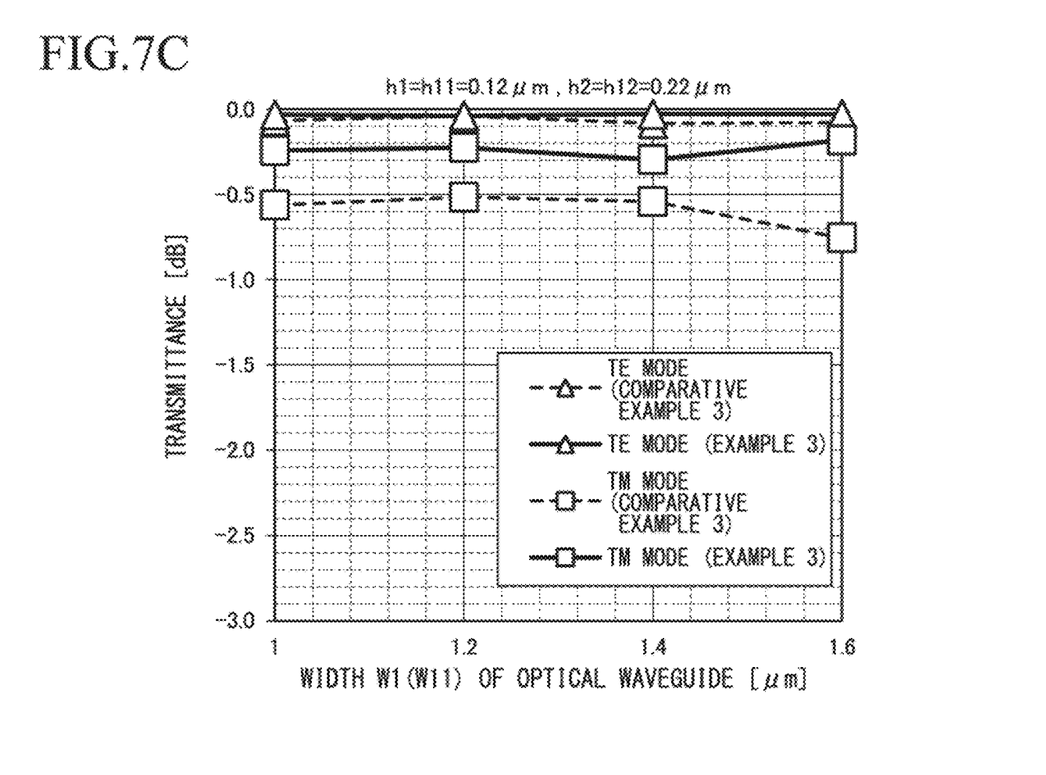
FIG. 7C is a graph showing the transmittance of the micro optical circuit according to the embodiment and the micro optical circuit according to the conventional example for TE mode light and TM mode light.

FIG. 7A shows a transmittance of light for the micro optical circuit 1 with h1=0.08 µm (Example 1) and the micro optical circuit 50 with h1=0.08 µm (Comparative Example 1), each with respect to the width w1 (w11) of the first micro optical waveguide 2. FIG. 7B shows a transmittance of light for the first micro optical waveguide 2 with h1=0.10 µm (Example 2) and the micro optical circuit 50 with h11=0.10 µm (Comparative Example 2), each with respect to the width w1 (w11) of the first micro optical waveguide 2. FIG. 7C shows a transmittance of light for the first micro optical waveguide 2 with h1=0.12 µm (Example 3) and the micro optical circuit 50 with h11=0.12 µm (Comparative Example 3), each with respect to the width w1 (w11) of the first micro optical waveguide 2.

From FIG. 7A to FIG. 7C, it is understood that in a range in which h1 (h11) is 0.08 µm or more and 0.12 µm or less and w1 (w11) is 1.0 µm or more and 1.6 µm or less, the transmittance of the micro optical circuit 1 is higher than the transmittance of the micro optical circuit 50 for both the TE mode light and the TM mode light. In particular, the difference in transmittance is noticeable for the TM mode light. This is thought to be due to the fact that the height of the micro optical waveguide changes discontinuously at the boundary face.

In addition, it is understood from the comparison of FIG. 7A to FIG. 7C that the difference in transmittance is the largest when h1 (h11) is 0.10 µm (FIG. 7B).

Figure 8:
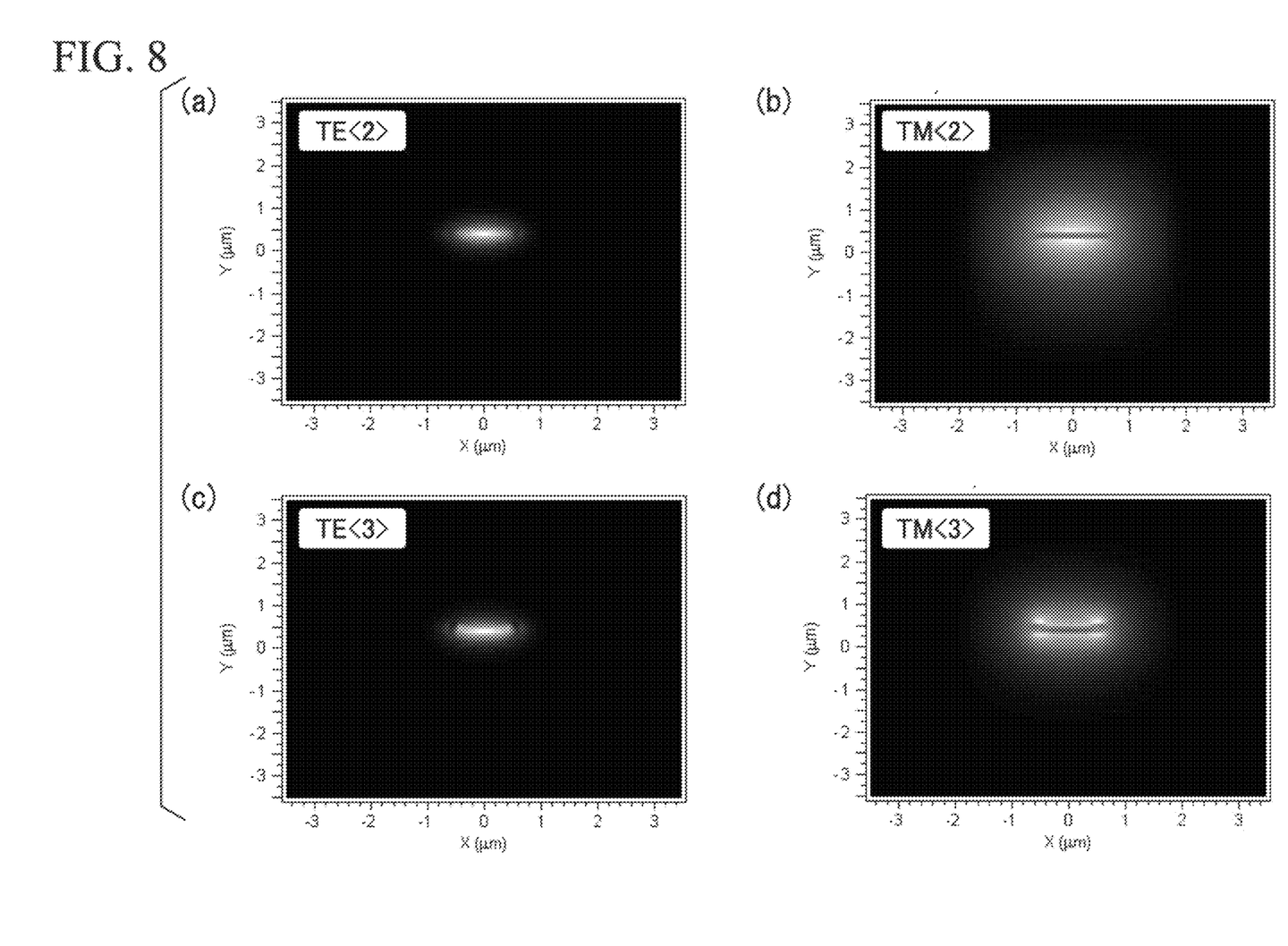
FIG. 8 are simulated images showing changes in the distribution of TE mode light and the distribution of TM mode light in the micro optical circuit according to an embodiment.

FIG. 8 shows simulation results of the optical mode distribution in the first micro optical waveguide 2 and the second micro optical waveguide 3 in the vicinity of the boundary face 3e of the micro optical circuit 1 with w1=1.2 µm and h1=0.10 µm (Example 2). The part (a) shows the distribution of the TE mode light in the first micro optical waveguide 2, the part (b) shows the distribution of the TM mode light in the first micro optical waveguide 2, the part (c) shows the distribution of the TE mode light in the second micro optical waveguide 3, the part (d) shows the distribution of the TM mode light in the second micro optical waveguide 3.

Figure 9:
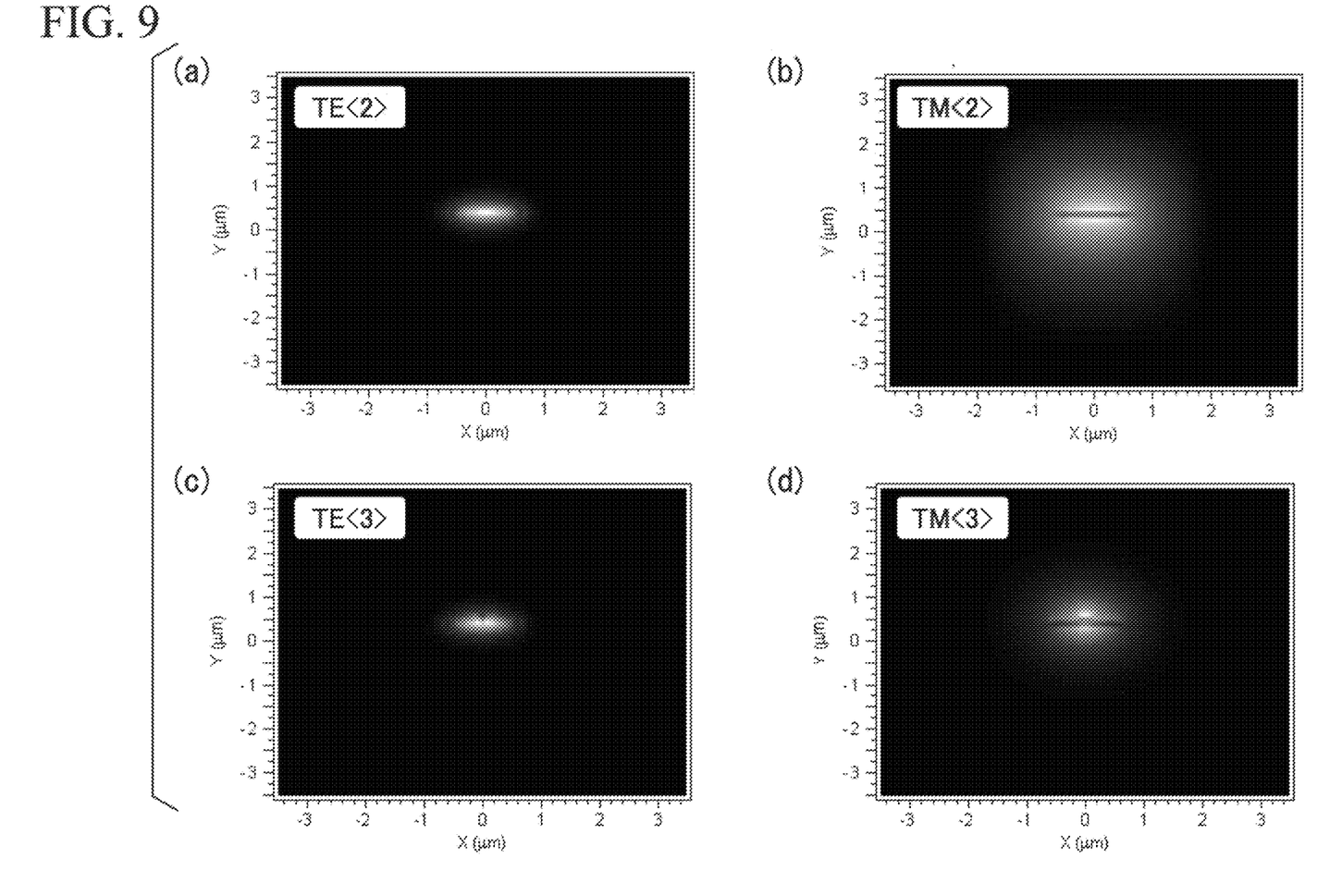
FIG. 9 are simulated images showing changes in the distribution of TE mode light and the distribution of TM mode light in a micro optical circuit according to a conventional example.

FIG. 9 shows simulation results of the optical mode distribution in the first micro optical waveguide 2 and the second micro optical waveguide 3 in the vicinity of the boundary face 13e of the micro optical circuit 50 with w11=1.2 µm and h11=0.10 µm (Comparative Example 2). Similarly, the part (a) shows the distribution of the TE mode light in the first micro optical waveguide 2, the part (b) shows the distribution of the TM mode light in the first micro optical waveguide 2, the part (c) shows the distribution of the TE mode light in the second micro optical waveguide 3, the part (d) shows the distribution of the TM mode light in the second micro optical waveguide 3.

In each of FIG. 8 and FIG. 9, the change from the part (a) to (b) shows a change in the distribution of the TE mode light at the boundary face 3e (13e), while the change from the part (c) to (d) shows a change in the distribution of the TM mode light at the boundary face 3e (13e).

From these results, it is understood that the change in the distribution of the TE mode light at the boundary face is relatively small for both the micro optical circuits 1 and 50.

It is understood that the change in the distribution of the TM mode light at the boundary face is noticeable particularly in the micro optical circuit 50, which shows large loss occurred at the boundary face. In contrast, the change in the distribution of the TM mode light at the boundary face 3e of the micro optical circuit 1 is very limited.

Since the boundary face 3e of the micro optical circuit 1 is recessed in the vicinity of the center of the micro optical waveguide where the optical mode concentrates and protrudes in the vicinity of the side face where the optical mode is small, a change in the mode diameter of propagation light was mitigated at the boundary face 3e, and thus the change in the TM mode light was reduced.

While preferred embodiments of the invention have been described and illustrated above, it should be understood that these are exemplary of the invention and are not to be considered as limiting. Additions, omissions, substitutions, and other modifications can be made without departing from the scope of the present invention. Accordingly, the invention is not to be considered as being limited by the foregoing description, and is only limited by the scope of the appended claims.

What is claimed is:

1. A micro optical circuit comprising:
a first micro optical waveguide having a first bottom face, a first top face arranged at a first height from the first bottom face, and a first side face and a second side face substantially perpendicular to the first bottom face and the first top face; and
a second micro optical waveguide having a second bottom face, a second top face arranged at a second height from the second bottom face, a third side face and a fourth side face substantially perpendicular to the second bottom face and the second top face, and a boundary face to which the first micro optical waveguide is connected, the second height being larger than the first height,
wherein the first side face is connected to the third side face at a first connection point in a plan view,
wherein the second side face is connected to the fourth side face at a second connection point in a plan view,
wherein an intersection between the boundary face and a center line equidistant from the third side face and the fourth side face is present in a region between a first straight line and a second straight line in a plan view, the first straight line passing through the first connection point and the second connection point, the second straight line crossing the second micro optical waveguide so as not to cross the first micro optical waveguide,
wherein the second micro optical waveguide includes a step portion protruding upward from the first top face of the first micro optical waveguide, and the boundary face is defined by an end face of the step portion, the end face facing the first micro optical waveguide,
wherein the boundary face includes a first face extending from the first connection point toward a first micro optical waveguide side of the first connection point and a second face extending from an end of the first face toward a second micro optical waveguide side of the first connection point and a third face extending from an end of the second face toward the first micro optical waveguide side of the first connection point such that the boundary face has a zigzag shape in a plan view, wherein the first height is 0.08 µm or more and 0.12 µm or less, and wherein, in a plan view, a width of the first micro optical waveguide and the second micro optical waveguide in the vicinity of the boundary face is 1.0 µm or more and 1.6 µm or less.

2. The micro optical circuit according to claim 1, wherein the entire boundary face is present in a region between the first straight line and the second straight line in a plan view.

3. The micro optical circuit according to claim 1, wherein the entire boundary face is present in a region between the first straight line and a third straight line in a plan view, the third straight line passing through an intersection between the center line and the boundary face.

4. The micro optical circuit according to claim 1,
wherein the boundary face has a section in which a distance between the boundary face and the center line monotonously decreases toward a point B on the boundary face, the point B being closest to the second straight line s2, wherein the section includes the point B, and wherein, in the section, a decrease rate of the distance increases as a distance from the point B decreases.

5. The micro optical circuit according to claim 1, wherein the boundary face is symmetrical with respect to the center line in a plan view.

6. The micro optical circuit according to claim 1, wherein a distance between the third side face and the fourth side face is substantially constant.

7. The micro optical circuit according to claim 1, wherein a distance between the third side face and the fourth side face increases or decreases as a distance from the first micro optical waveguide increases.

8. An optical mode converter comprising:
the micro optical circuit according to claim 1; and
a cladding covering the micro optical circuit.

9. The micro optical circuit according to claim 1, wherein the intersection between the boundary face and the center line is located on a second micro optical waveguide side of the first straight line.

10. The micro optical circuit according to claim 1, wherein the first side face is flush with the third side face at the first connection point in a plan view, and the second side face is flush with the fourth side face at the second connection point in a plan view.

* * * * *